United States Patent
Wong et al.

(10) Patent No.: US 8,666,937 B2
(45) Date of Patent: Mar. 4, 2014

(54) SYSTEM, METHOD AND COMPUTER PROGRAM PRODUCT FOR VERSIONING CONTENT IN A DATABASE SYSTEM USING CONTENT TYPE SPECIFIC OBJECTS

(75) Inventors: Simon Wong, San Carlos, CA (US); Walter Macklem, San Francisco, CA (US); Mark Fischer, Ashland, OR (US); Orjan Kjellberg, Walnut Creek, CA (US); Oliver Pin, San Francisco, CA (US); Sonali Agrawal, San Carlos, CA (US); Ron Pragides, San Francisco, CA (US); Etienne Giraudy, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 121 days.

(21) Appl. No.: 13/047,697

(22) Filed: Mar. 14, 2011

(65) Prior Publication Data
US 2011/0225119 A1    Sep. 15, 2011

Related U.S. Application Data

(60) Provisional application No. 61/313,621, filed on Mar. 12, 2010.

(51) Int. Cl.
*G06F 17/00* (2006.01)
(52) U.S. Cl.
USPC ............ 707/609; 707/736; 707/738; 707/705
(58) Field of Classification Search
USPC .................................. 707/609, 636, 638, 705
See application file for complete search history.

(56) References Cited

U.S. PATENT DOCUMENTS

| | | | |
|---|---|---|---|
| 6,430,563 B1 * | 8/2002 | Fritz et al. ........................ 707/10 |
| 6,647,396 B2 * | 11/2003 | Parnell et al. .................. 707/695 |
| 7,209,929 B2 | 4/2007 | Dominguez, Jr. et al. |
| 7,529,728 B2 | 5/2009 | Weissman et al. |
| 7,698,160 B2 | 4/2010 | Beaven et al. |
| 7,930,681 B2 * | 4/2011 | Kloeffer et al. ............... 717/120 |
| 8,010,887 B2 * | 8/2011 | Soria et al. .................... 715/229 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2002/0174128 A1 * | 11/2002 | Govindarajan et al. ........ 707/100 |
| 2003/0233404 A1 | 12/2003 | Hopkins |
| 2005/0038812 A1 * | 2/2005 | Tirpak et al. ................ 707/104.1 |
| 2005/0065925 A1 | 3/2005 | Weissman et al. |
| 2005/0223022 A1 | 10/2005 | Weissman et al. |
| 2005/0283478 A1 | 12/2005 | Choi et al. |
| 2006/0206834 A1 | 9/2006 | Fisher et al. |

(Continued)

OTHER PUBLICATIONS

U.S. Appl. No. 60/828,192, filed Oct. 4, 2006.

*Primary Examiner* — John Breene
*Assistant Examiner* — Andalib Lodhi
(74) *Attorney, Agent, or Firm* — Zilka-Kotab, PC

(57) ABSTRACT

In accordance with embodiments, there are provided mechanisms and methods for versioning content in a database system using content type specific objects. These mechanisms and methods for versioning content in a database system using content type specific objects can enable embodiments to provide a database system which stores information associated with multiple versions of content. The ability of embodiments to provide a database system which supports content versioning can enable an efficient and comprehensive storage of content types having different features by the database system.

18 Claims, 5 Drawing Sheets

(56) References Cited

U.S. PATENT DOCUMENTS

2008/0140696 A1* 6/2008 Mathuria ................ 707/102
2009/0024609 A1* 1/2009 Barker et al. ................ 707/5
2009/0320035 A1* 12/2009 Ahlgren et al. ............ 718/104
2010/0318511 A1* 12/2010 Phan et al. ................ 707/722
2011/0004621 A1* 1/2011 Kelley et al. ............... 707/769

* cited by examiner

KNOWLEDGE ARTICLE VERSION TABLE

| ORG ID | KP | KAV_PK | KA_PK | STANDARD FIELD 1 | ... | STANDARD FIELD N |
|---|---|---|---|---|---|---|
| | Ka0 | X | xx | | | |
| | Ka1 | Y | yy | | | |
| | Ka0 | Z | zz | | | |
| | | | | | | |

KNOWLEDGE ARTICLE VERSION CUSTOM FIELD DATA TABLE

| PK | CUSTOM FIELD 1 | CUSTOM FIELD 2 | ... | CUSTOM FIELD N |
|---|---|---|---|---|
| X | | | | |
| Y | | | | |
| Z | | | | |
| | | | | |

KNOWLEDGE ARTICLE TABLE

| ORG ID | KA_PK | CONTENT |
|---|---|---|
| | xx | FAQ_01 |
| | yy | USER MANUAL |
| | zz | FAQ_02 |
| | | |

SYSTEM, METHOD AND COMPUTER PROGRAM PRODUCT FOR VERSIONING CONTENT IN A DATABASE SYSTEM USING CONTENT TYPE SPECIFIC OBJECTS

CLAIM OF PRIORITY

This application claims the benefit of U.S. Provisional Patent Application 61/313,621 entitled "ABSTRACT ENTITY OBJECT WHICH CAN SHARE A CUSTOM FIELD DEFINITION AND BE EXTENDED TO ALLOW SEARCHING BY TYPE AND SUBTYPE," by Wong et al., filed Mar. 12, 2010 (SFC1P079+/197PROV), the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to versioning content in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, a database is generally able to store various different types of content using objects. For example, the database may store standard types of content using standard objects and/or custom types of content using custom objects. However, techniques for storing content have generally exhibited various limitations.

For example, conventional database systems typically store objects across a single table, which inefficiently, or more often impractically, support storage of information with respect to multiple versions of content. As another example, conventional database systems do not necessarily take into account when different types of objects (i.e. storing different types of content) have some types of data which are different and some types of data which are common, such that the database does not maximize efficiency with respect to storing such data types.

Accordingly, it is desirable to provide techniques enabling efficient and comprehensive storage of content types having different features by the database system.

BRIEF SUMMARY

In accordance with embodiments, there are provided mechanisms and methods for versioning content in a database system using content type specific objects. These mechanisms and methods for versioning content in a database system using content type specific objects can enable embodiments to provide a database system which stores information associated with multiple versions of content. The ability of embodiments to provide a database system which supports content versioning can enable an efficient and comprehensive storage of content types having different features by the database system.

In an embodiment and by way of example, a method for versioning content in a database system using content type specific objects is provided. In use, content is stored. Additionally, a type of the content is identified. Further, for each version of the content, information associated with the version is stored in a database using at least one object specific to the type of the content. Moreover, the information is pointed to the stored content.

While one or more implementations and techniques are described with reference to an embodiment in which versioning content in a database system using content type specific objects is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are pr vided for versioning content in a database system using content type specific objects.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing versioning of content in a database system using content type specific objects will be described with reference to example embodiments.

Figure 1:
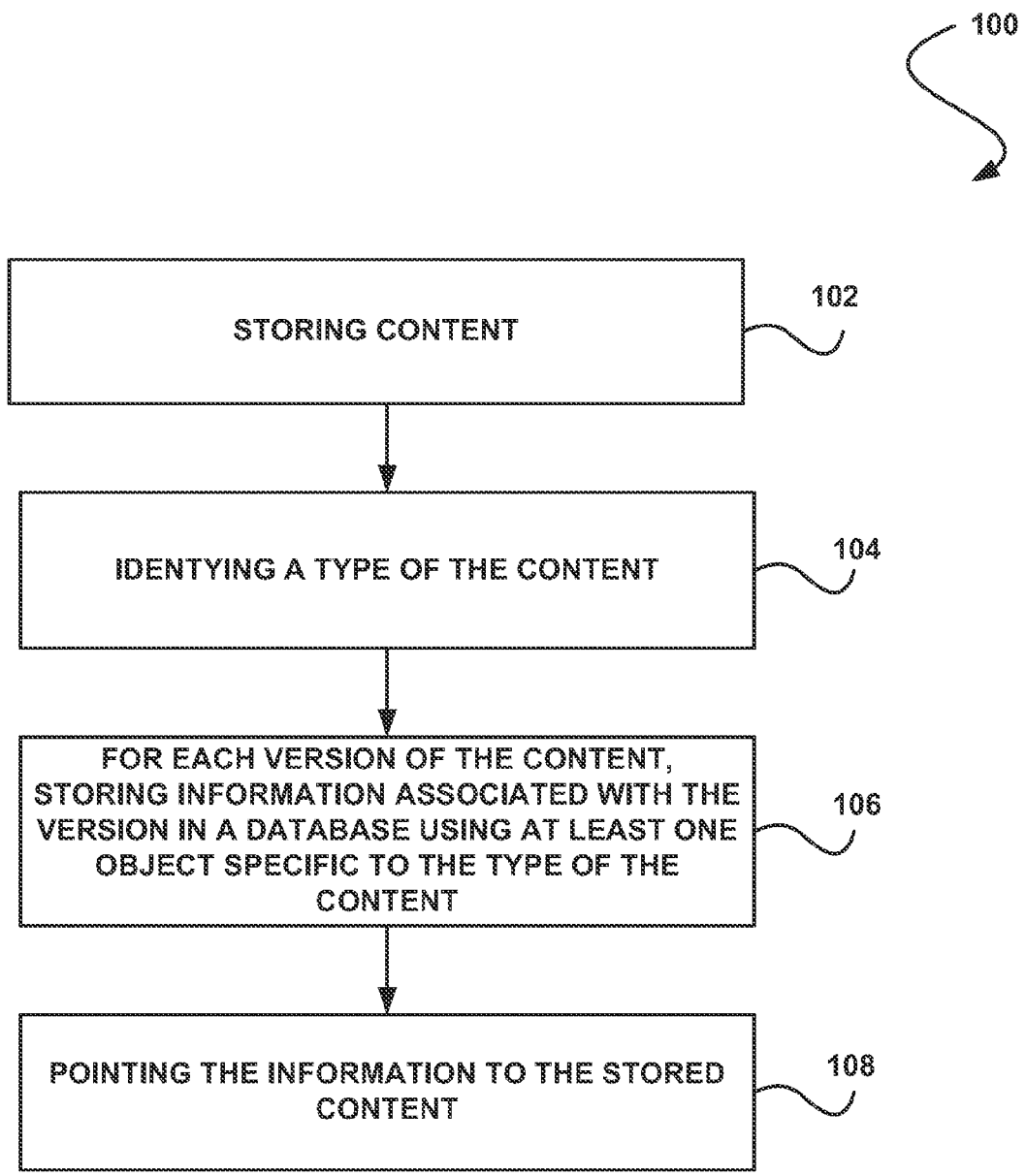
FIG. 1 illustrates a method for versioning content in a database system using content type specific objects, in accordance with an embodiment.

FIG. 1 illustrates a method 100 for versioning content in a database system using content type specific objects, in accordance with an embodiment. As shown in operation 102, content is stored. In the context of the present embodiment, the content may include any data, data structure, code, etc. capable of being stored. Just by way of example, the content may include a document, such as a knowledge-based document [e.g. user manual, frequently asked questions (FAQs), etc.]

In one embodiment, the content may be stored in a file system. In another embodiment, the content may be stored in a database. For example, the content may be stored in a file system/database of a multi-tenant on-demand database system. Optionally, the content may be stored for being accessed by tenants of the multi-tenant on-demand database system (e.g. via a query, etc.).

Additionally, as shown in operation 104, a type of the content is identified. The type of the content may include any categorization of the content. Just by way of example, the type of the content may include one of a plurality of predetermined categories. In the above example of content that includes knowledge-based content, the type of the content may include one of a user manual, FAQs, etc.

It should be noted that the type of the content may be identified in any desired manner. In one embodiment, the type of the content may be identified based on subject matter included in the content. For example, the content may be analyzed to determine the subject matter, and a category for such subject matter may then be identified (e.g. based on keywords included in the subject matter which correspond with a particular category, etc.).

Further, as shown in operation 106, for each version of the content, information associated with the version is stored in a database using at least one object specific to the type of the content. In the context of the present description, each version of the content may include at least one aspect which is different from other versions of the content. For example, each version may represent a different update, change, etc. made to the content (e.g. by a user).

In addition, the object specific to the type of the content in which the information is stored may include a record specific to the type of the content. For example, the record may be specific to the type of the content by having fields configured according to the type of the content. Thus, the fields of an object used to store information associated with one type of content may be at least partially different than fields of an object used to store information associated with another type of content. This may be a result of a difference in information capable of being associated with different types of objects, or a different in information desired to be stored in the database with respect to the different types of objects. It should be noted that sub-types of content may be handled similarly to the use of content types described herein.

The information associated with the version may include any information describing at least one aspect of the version. As an option, the information may be extracted from the content (e.g. a header of the content, a body of the content, etc.). As another option, the information may be identified by analyzing the content. As yet another option, the information may be identified via a message associated with the content (e.g. sent by the tenant when uploading the content).

In one embodiment, the information may include standard information stored in standard fields of the database (e.g. the database in which the content may optionally be stored). Just by way of example, the standard information may include at least one of a title of the content, a version number of the content, a publication date of the content, etc.

To this end, the standard fields may include a title field (for storing a title of the associated content), a version field (for storing a version number of the associated content), a publication date field (for storing a publication date of the associated content), etc. Optionally, the standard fields may be common to each object in the database. For example, objects associated with each type of content may all include the standard fields.

In another embodiment, the information may include custom information stored in custom fields of the database (e.g. the database in which the content may optionally be stored). As an option, the custom information may include information specific to the type of the content. Just by way of example, where the content includes a user manual, the custom information may include a product number identifying a specific product to which the user manual pertains. As another example, for each version, the associated object may include at least one field for storing information indicating a change in the content (e.g. between the version and an immediately prior version or between the version and the original version of the content).

To this end, the custom fields may include fields for storing custom information that is specific to the type of the content associated with the object including such custom fields (e.g. a product number field for storing the aforementioned product number). It should be noted that at least a portion of the custom fields may be unique to the object that is specific to the type of the content. For example, for each type of content, the associated object may include at least one custom field that is unique with respect to objects associated with other types of content.

Of course, as another option, at least a portion of the custom fields may be shared among different objects each specific to a different type of content. Accordingly, at least one custom field may be shared among objects associated with different types of content. Just by way of example, an object associated with content which includes a user manual and an object associated with content which includes FAQs may share a custom field indicative of a manufacturer of a product to which the user manual and FAQs pertain.

In one embodiment, a single object may store all information associated with the version. For example, a single object (e.g. record) may store the standard information and the custom information. Thus, the single object may be included in a single table of the database (e.g. where such table optionally stores objects associated with content of different types).

In another embodiment, a plurality of objects (e.g. records) may store the information associated with the version. For example, a first object may store the standard information and a second object may store the custom information. Optionally, the database may include a first table including the standard fields for storing the standard information associated with the version and a second table including the custom fields for storing the custom information associated with the version. As a further option, a private key may be shared among the first table and the second table, namely the first object and the second object, for associating the standard information with the custom information.

Moreover, as shown in operation 108, the information is pointed to the stored content. In one embodiment, the information may be pointed to the stored content directly by storing, in association with the information, a reference to the stored content. For example, the reference may be stored in a field of the object. In another embodiment, the information may be pointed to the stored content indirectly by storing, in association with the information, a reference to another object (e.g. record) of another table of the database storing a reference to the stored content.

As noted above, the content may be stored in the database, in one embodiment. Thus, pointing the information to the stored content may include pointing the information to an object of the database storing the content. As also noted above, the content may be stored in a file system, in another embodiment. With respect to such embodiment, pointing the information to the stored content may include pointing the information to a location in the file system (e.g. a memory address in the file system).

To this end, pointing the information to the stored content may include storing a reference to the stored content in association with the information associated with the version, such that each of the versions points to a single instance of the content. For example, as described above, for each version, the associated object may include at least one field for storing information indicating a change in the content (e.g. between the version and an immediately prior version or between the version and the original version of the content). Thus, each object associated with a different version of the content may indicate a change to the stored content necessitating the new version, and may each reference the same stored content.

It should be noted that in another embodiment, a method (not shown) may be implemented for sharing fields among objects associated with different content types. For example, the aforementioned sharing of custom fields among objects associated with different content types may be utilized with respect to objects that are independent of a version of the associated content. In particular, content may be stored and a first type of the content may be identified. Additionally, information associated with the content may be stored in a database using at least one first object specific to the first type of the content. Further, a custom field of the first object may be configured to be shared with at least one second object specific to a second type of content different than the first type of the content. In this way, objects representing different types of content (e.g. regardless of a version of the content) may share custom fields. Various embodiments of sharing custom fields among objects specific to content versions that are also associated with different content types are described below, and it should be noted that such embodiments may also be implemented for objects which are not necessarily specific to content versions, but which generally represent content (e.g. all versions of the content). For example, the storage of shared custom fields and the querying of shared custom fields, as described below, may also be implemented for objects which are not necessarily specific to content versions.

Figure 2:
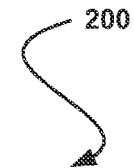
FIG. 2 illustrates tables of database system for versioning content using content type specific objects, in accordance with an embodiment.

FIG. 2 illustrates tables of database system 200 for versioning content using content type specific objects, in accordance with an embodiment. As an option, the database system 200 may be implemented in the context of the functionality of FIG. 1. For example, the database system 200 may be implemented by the multi-tenant on-demand database system described herein. Of course, however, the database system 200 may be implemented in any desired environment. Again, the aforementioned definitions may apply during the present description.

As shown, a Knowledge Article Table stores a private key (KA_PK) and associated content (CONTENT). For example, each different stored content may have one single row in the Knowledge Article Table with a unique private key. In one embodiment, the content may be stored in the Knowledge Article Table in association with the private key. In another embodiment, the content may be stored in a file system, such that a reference [e.g. uniform resource locator (URL)] to the content may be stored in the Knowledge Article Table in association with the private key.

The Knowledge Article Table private key may provide a stable identifier to content so that any reference to the content (e.g. a URL, etc.) can use the private key, instead of the below described Knowledge Article Version Table private key (KAV_PK), and still be valid as new underlying versions of the content are published over time (and thus new private keys in the Knowledge Article Version Table assigned to such new versions). For example, the system can, at query time through the Knowledge Article Table private key, redirect to the most recent Knowledge Article Version Table row that contains the latest version of the content. Also just like the Knowledge Article Version Table, the Knowledge Article Table may have a tenant identifier (ORG ID) identifying the same tenant as its Knowledge Article Version Table rows for which the content is stored.

The Knowledge Article Version Table may store a plurality of objects, each included in a different row of the Knowledge Article Version Table. In the embodiment shown, the Knowledge Article Version Table includes a tenant identifier (ORG ID) identifying a tenant for which the associated content is stored, a key prefix (KP) identifying a type of the associated content, a private key (KAV_PK) unique to the object, and various standard fields for storing standard information associated with each object. Accordingly, objects storing information associated with different types of content (as indicated by the different KPs) may be stored in the Knowledge Article Version Table.

The standard fields may include a title field, version field, etc. The Knowledge Article Version Table may also include a Knowledge Article Table private key (KA_PK) field such that each object in the Knowledge Article Version Table references the content (or a location thereof) with which it is associated via the KA_PK. As another option, the Knowledge Article Version Table may include a field for storing references to related content.

Further, a Knowledge Article Version Custom Field Data Table may store a plurality of objects associated with the objects stored in the Knowledge Article Version Table. As shown, each object in the Knowledge Article Version Custom Field Data Table may include a private key (PK) field for storing a private key which references a private key of the Knowledge Article Version Table. To this end, an object in the Knowledge Article Version Custom Field Data Table may reference an object in the Knowledge Article Version Table, and vice versa.

The Article Version Custom Field Data Table also includes custom fields. Thus, the fields in the Article Version Custom Field Data Table may be at least partially different for each object associated with a different type of content. As shown, an object storing information associated with content of a first type (referenced by PK=Y) may have a different type of custom field (i.e. for storing a different type of data) than an object storing information associated with content of a second type (referenced by PK=Z). For example, for one column of the Article Version Custom Field Data Table, the custom fields therein may be of various different types (i.e. for storing different types of information).

As also shown, in another embodiment, an object storing information associated with content of a first type (referenced by PK=Y) may have a same type of custom field (i.e. for storing a different type of data) as an object storing information associated with content of a second type (referenced by PK=Z). To this end, for another column of the Article Version Custom Field Data Table, the custom fields therein may be of a same type (i.e. for storing the same type of information). Optionally, a certain number of pre-allocated fields in the Article Version Custom Field Data Table may be reserved for common custom fields.

It should be noted that logical custom fields on content types (shared or not) may be mapped onto a fixed set of physical columns on a custom field data table. For example, organization-specific and/or entity-specific custom fields may be assigned to fixed physical columns on the custom field data table. As another example, a query optimizer may be used to map the columns and generate the actual query on the database. Embodiments of the aforementioned examples are described in U.S. Pat. No. 7,779,039 entitled "Custom entities and fields in a multi-tenant database system," by Weissman et al. filed Apr. 2, 2004; and U.S. Pat. No. 7,529,728, entitled "Query optimization in a multi-tenant database system," by Weissman et al. filed Sep. 23, 2003, which are both herein incorporated by reference in their entirety for all purposes.

Figure 3:
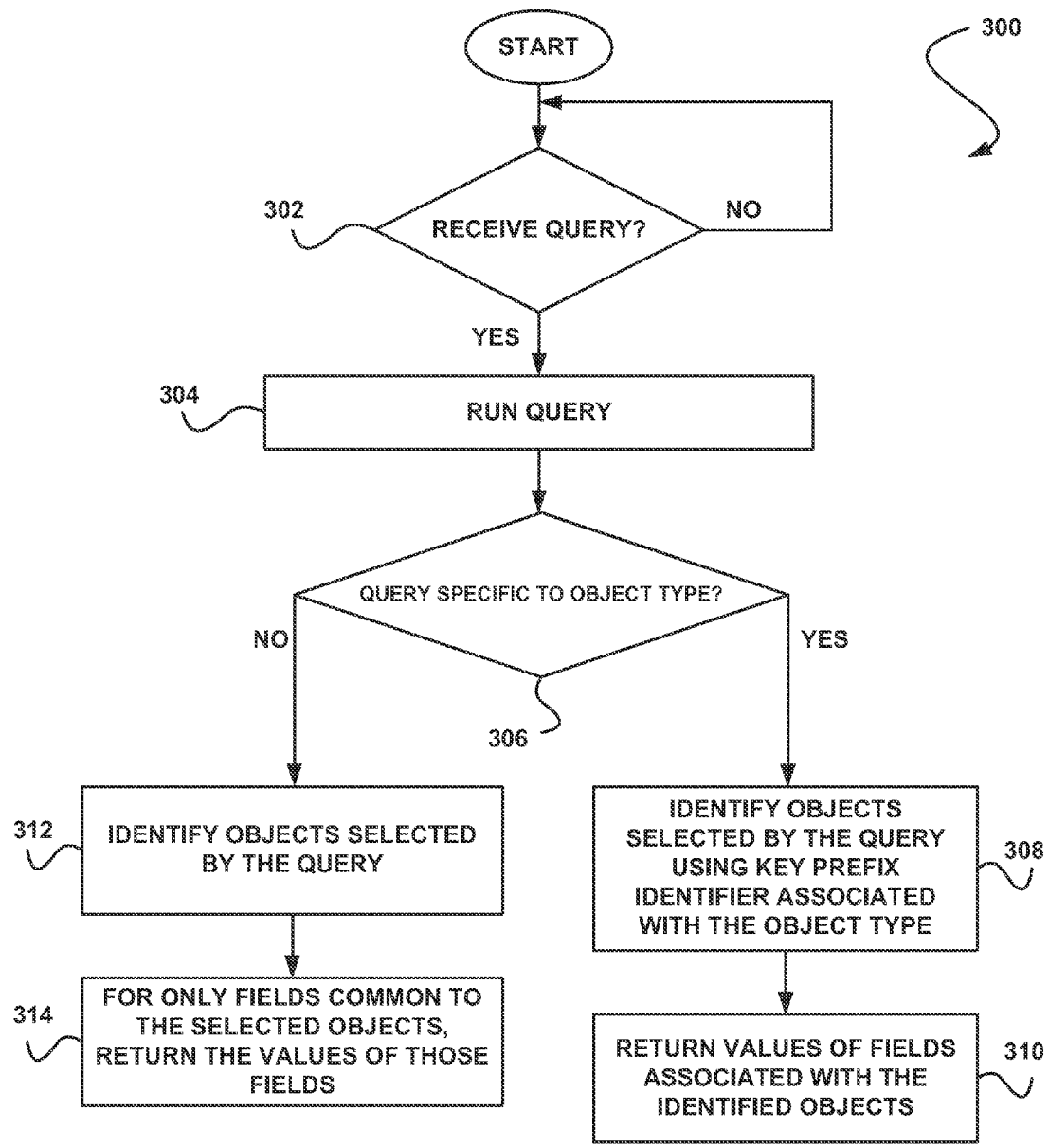
FIG. 3 illustrates a method for querying a database storing content versioned using content type specific objects, in accordance with an embodiment.

FIG. 3 illustrates a method 300 for querying a database storing content versioned using content type specific objects, in accordance with an embodiment. As an option, the present method 300 may be carried out in the context of the functionality of FIGS. 1-2. For example, the method 300 may be carried out on the database system of FIG. 2. Of course, however, the method 300 may be carried out in any desired environment. Again, the aforementioned definitions may apply during the present description.

As shown in decision 302, it is determined whether a query has been received. The query may include any query for at least one object, or portion thereof. In one embodiment, the query may be for an object storing information associated with a particular content.

If it is determined that a query has not been received, the method 300 continues to wait for receipt of such a query. However, once it is determined that query has been received, the query is run. Note operation 304. For example, statements in the query may be executed against a database indicated by the query.

Additionally, as shown in decision 306, it is determined whether the query is specific to a particular type of object. In one embodiment, a user may issue a query to select from a particular type of object. For example, the user may include a statement in the query to select from a particular type of object by referencing a name of the particular type of object (e.g. "select . . . from . . . . UserManual"). In response, a key prefix identifier assigned to the particular type of object referenced in the query may be automatically identified. Just by way of example, based on the query text, our infrastructure is what is generating the "where key prefix='kA0'" clause in the generated database query. Thus, the generated database query may include a where clause to filter on the key prefix column of the object table. One example of automatically generating a clause in the query to reference the key prefix identifier is described in U.S. Pat. No. 7,779,039, entitled "Custom entities and fields in a multi-tenant database system," by Weissman et al. filed Apr. 2, 2004, which is herein incorporated by reference in its entirety for all purposes.

In another embodiment, a user may issue a query to select from all types of objects. For example, the user may include a statement in the query to select from all object types (e.g. "select . . . from Objects" or where the objects are knowledge articles, "select . . . from KnowledgeArticle").

For example, if the query is specific to an object type, then only objects associated with the particular type of object identified by the key prefix identifier (i.e. having the key prefix identifier) may be retrieved. Table 1 illustrates an example of a query which includes a key prefix identifier. Of course, it should be noted that the query shown in Table 1 is set forth for illustrative purposes only, and thus should not be construed as limiting in any manner.

TABLE 1

SELECT
FROM Knowledge Article Version Table
WHERE ORG ID = < > AND KP = < >

As another example, if the query is not specific to an object type, then objects associated any type of content (i.e. having any key prefix identifier) may be retrieved. Table 2 illustrates an example of a query which does not include a key prefix identifier. Of course, it should be noted that the query shown in Table 2 is set forth for illustrative purposes only, and thus should not be construed as limiting in any manner.

TABLE 2

SELECT
FROM Knowledge Article Version Table
WHERE ORG ID = < >

If it is determined that the query is not specific to an object type, then objects selected by the query are identified. Note operation 312. In particular, objects meeting the criteria of the query which are returned from the running of the query (in operation 304) may be identified.

Furthermore, for only the fields that are common to all of the selected objects, values of the fields are returned, as shown in operation 314. Thus, the fields which are the same across all of the returned objects may be determined. For example, the standard fields and the shared custom fields may be determined. In this way, the values of such determined fields may be returned as a result of the query.

To this end, only fields that are common to all objects types may be capable of being referenced in the query. The query may only return the values of those fields that are common to all object types. Similarly, the query may only filter on those fields that are common to all object types. Fields common to all object types may include standard fields and the shared custom fields. To this end, for example, if Publisher is a custom field specific to an object type UserManual, and hence not applicable to an object type FAQ, then it may not be allowed to run a query to select from all object types where Publisher has a certain value. It may also not be allowed to run a query to select Publisher from all object types.

If it is determined that the query is specific to an object type, then objects selected by the query using the key prefix identifier associated with the particular type of object are identified. Note operation 308. For example, only objects having the key prefix identifier (e.g. associated with content of the type identified by the key prefix identifier) may be identified. Thus, only objects of the particular type of object referenced in the query may be identified.

Moreover, values of fields associated with the identified objects are returned, as shown in operation 310. Thus, a value for each field included in the identified objects may be returned, since the identified objects may have the same standard fields and custom fields. For example, since the key prefix is specified, the query may be free to reference any shared field or any field that is specific to the object type of the given key prefix. But, it may not be allowed to reference any custom field specific to other article types. Just by way of example, if Publisher is a custom field specific to article type UserManual, it may not make sense to query or filter on Publisher when the query key prefix is that of article type FAQs.

System Overview

Figure 4:
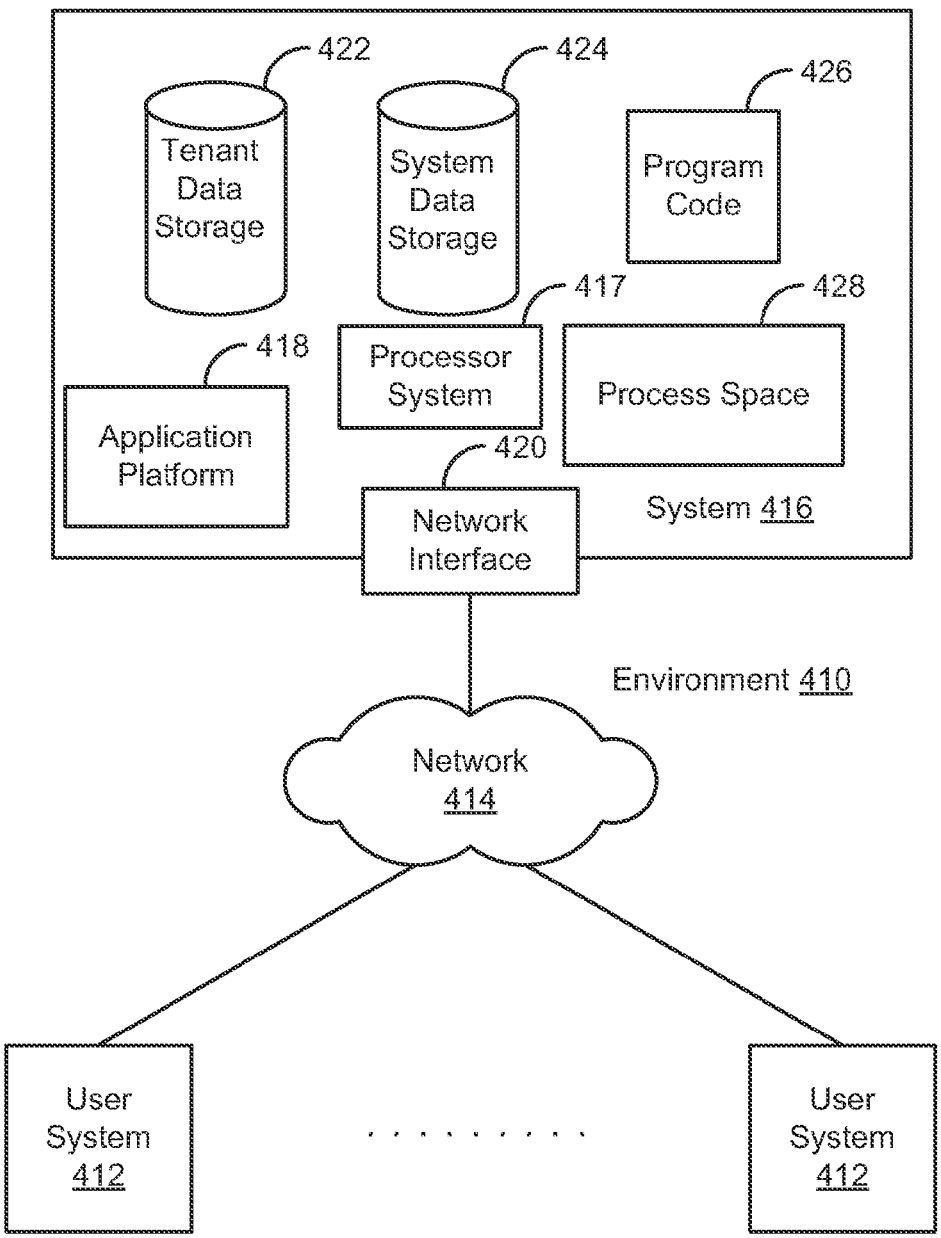
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored in tables of a common database image to form a multi-tenant database system (MTS). Accordingly, on-demand database service 416" and "system 416" will be used interchangeably herein. A database image may include one or more database objects. A relational database management system (RIMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTPS client, e.g., a browsing program, such as Microsoft's Internet Explorer browser. Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where inure than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN. LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
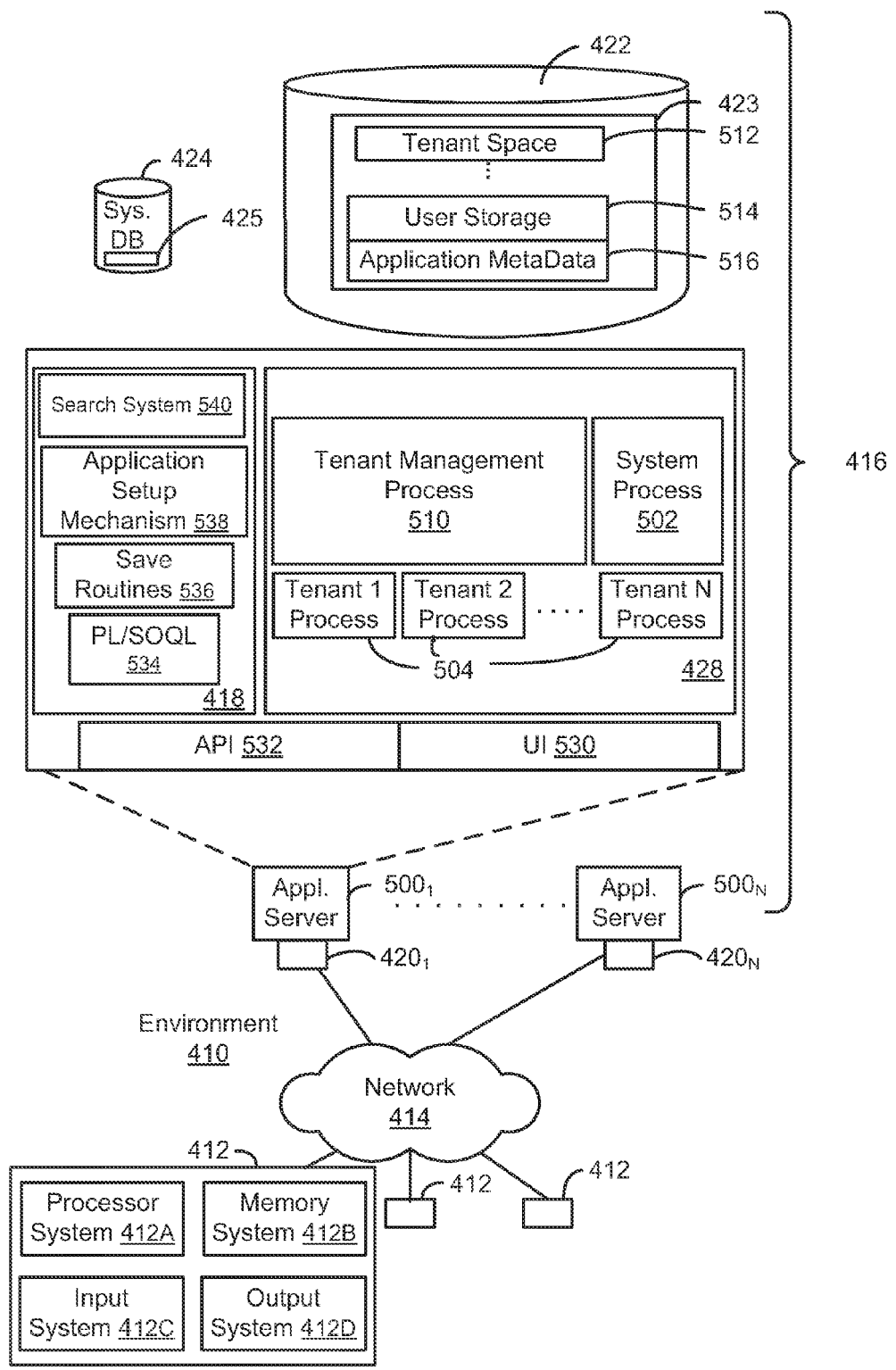
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 41213, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers 500$_1$-500$_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4, Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an NITS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to implement a method for versioning content in a database system using content type specific objects, the method comprising:
    storing content, where the content is associated with a plurality of different versions;
    identifying a type of the content by:
        analyzing the content to determine one or more keywords indicating a subject matter of the content; and
        determining a category of the content that corresponds to the one or more keywords;
    for each of the plurality of different versions of the content, storing information associated with the version in at least one object of a database,
        where the at least one object is separate from the content,
        where the at least one object is specific to the type of the content by having fields to store the information, and
        where the fields are configured according to the type of the content such that one or more fields of an object used to store information associated with a first type of content are different from one or more fields used to store information associated with a second type of content; and
    generating a link between the information and the stored content.

2. The computer program product of claim 1, wherein the content includes a document.

3. The computer program product of claim 2, wherein the document includes a knowledge-based document.

4. The computer program product of claim 1, wherein the content is stored in one of a file system of a multi-tenant on-demand database system and the database.

5. The computer program product of claim 1, wherein the type of the content includes one of a plurality of predetermined categories.

6. The computer program product of claim 1, wherein each version of the content includes at least one aspect which is different from other versions of the content.

7. The computer program product of claim 1, wherein the information associated with the version includes standard information stored in standard fields of the database.

8. The computer program product of claim 7, wherein the standard fields are common to each object in the database.

9. The computer program product of claim 7, wherein the standard information includes at least one of a title of the content, a version number of the content, and a publication date of the content.

10. The computer program product of claim 7, wherein the standard information is stored in association with a key prefix identifying the type of the content.

11. The computer program product of claim 1, wherein the database includes a first table including standard fields for storing standard information associated with the version and a second table including custom fields for storing custom information associated with the version.

12. The computer program product of claim 11, wherein a private key is shared among the first table and the second table, for associating the standard information associated with the version with the custom information associated with the version.

13. The computer program product of claim 1, wherein for each of the plurality of different versions of the content, a reference to the stored content is included in the information associated with the version stored in the least one object, such that each of one or more objects associated with each of the plurality of different versions of the content points to the same instance of the content.

14. The computer program product of claim 1, further comprising, in response to receipt of a query on the database:
    determining whether the query is specific to a particular type of object;
    if it is determined that the query is specific to the particular type of object, identifying only objects of the particular type of object and returning values of fields associated with the identified objects; and
    if it is determined that the query is not specific to the particular type of object, identifying objects selected by the query and returning, only for fields that are common to all of the selected objects, values of the fields.

15. The computer program product of claim 1, wherein the fields of the at least one first object are configured according to the first type of the content by including custom fields specific to the first type of the content that store at least a portion of the information that is custom to the first type of the content.

16. A method, comprising:
    storing content, where the content is associated with a plurality of different versions;
    identifying a type of the content by:
        analyzing, the content to determine one or more keywords indicating a subject matter of the content; and determining a category of the content that corresponds to the one or more keywords;

for each of the plurality of different versions of the content, storing information associated with the version in at least one object of a database, where the at least one object is separate from the content, where the at least one object is specific to the type of the content by having fields to store the information, and where the fields are configured according to the type of the content such that one or more fields of an object used to store information associated with a first type of content are different from one or more fields used to store information associated with a second type of content: and generating a link between the information and the stored content.

17. An apparatus, comprising:

a processor for;

storing content, where the content is associated with a plurality of different versions;

identifying a type of the content by:
analyzing the content to determine one or more keywords indicating a subject matter of the content; and
determining a category of the content that corresponds to the one or more keywords;

for each of the plurality of different versions of the content, storing information associated with the version in at least one object of a database, where the at least one object is separate from the content, where the at least one object is specific to the type of the content by having fields to store the information, and where the fields are configured according to the type of the content such that one or more fields of an object used to store information associated with a first type of content are different from one or more fields used to store information associated with a second type of content; and generating a link between the information and the stored content.

18. A computer program product, comprising a non-transitory computer usable medium having a computer readable program code embodied therein, the computer readable program code adapted to be executed to implement a method for sharing fields among different content types, the method comprising:

storing content, where the content is associated with a plurality of different versions;

identifying a first type of the content including a category of the content by analyzing the content to determine one or more keywords indicating a subject matter of the content and determining a category of the content that corresponds to the one or more keywords;

storing information associated with the content in at least one first object of a database, where the at least one first object is separate from the content and is specific to the first type of the content by having fields to store the information, where the fields are configured according to the first type of the content such that one or more fields of an object used to store information associated with the first type of content are different from one or more fields used to store information associated with a second type of content; and configuring a custom field of the first object to be shared with at least one second object specific to the second type of content different than the first type of the content.

* * * * *

UNITED STATES PATENT AND TRADEMARK OFFICE
CERTIFICATE OF CORRECTION

PATENT NO.        : 8,666,937 B2                                     Page 1 of 1
APPLICATION NO.   : 13/047697
DATED             : March 4, 2014
INVENTOR(S)       : Wong et al.

It is certified that error appears in the above-identified patent and that said Letters Patent is hereby corrected as shown below:

On the title page:
(75) Inventors; replace 5$^{th}$ inventor "Oliver" with --Olivier--.

In the claims:
Claim 16, col. 16, line 66; replace "analyzing," with --analyzing--;
Claim 16, col. 17, line 8; replace "haying" with --having--;
Claim 16, col. 17, line 14; replace "content:" with --content;--;
Claim 17, col. 17, line 18; replace "for;" with --for:--.

Signed and Sealed this
Sixth Day of January, 2015

Michelle K. Lee
*Deputy Director of the United States Patent and Trademark Office*